July 23, 1968

C. FREDA 3,393,457

COURSE PROTRACTOR

Filed Nov. 25, 1966

INVENTOR.
CARMINE FREDA

BY Brumbaugh, Free, Graves & Donohue his ATTORNEYS

July 23, 1968   C. FREDA   3,393,457
COURSE PROTRACTOR
Filed Nov. 25, 1966   2 Sheets-Sheet 2
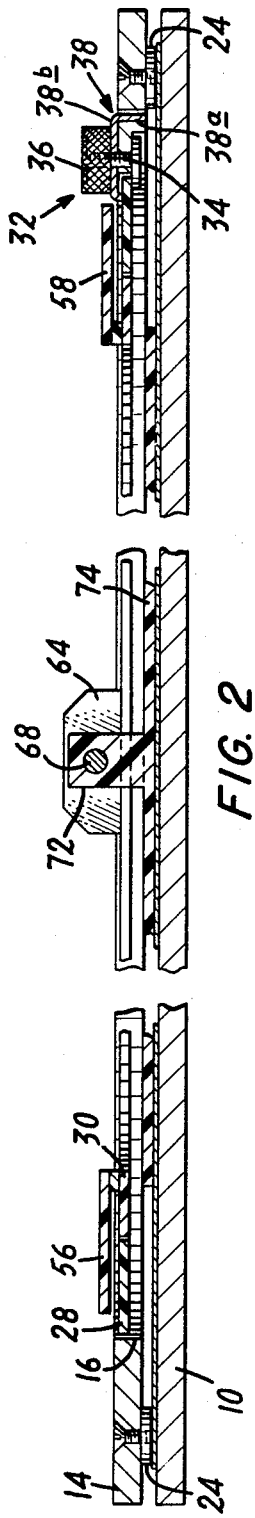
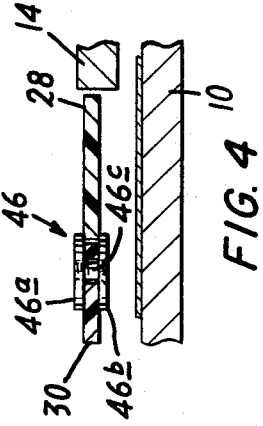
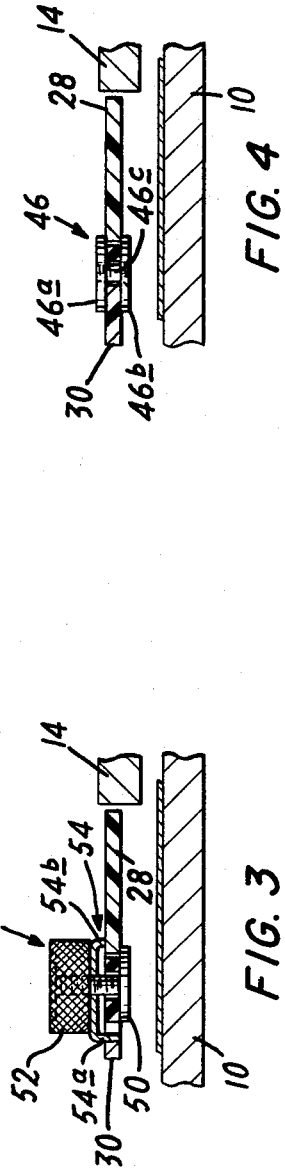
INVENTOR.
CARMINE FREDA
BY
his ATTORNEYS

United States Patent Office 3,393,457
Patented July 23, 1968

3,393,457
COURSE PROTRACTOR
Carmine Freda, River Road, Grandview-on-the-Hudson, N.Y.
Filed Nov. 25, 1966, Ser. No. 596,950
9 Claims. (Cl. 33—75)

ABSTRACT OF THE DISCLOSURE

As described herein, a course protractor includes a chart board having a frame with a large diameter opening formed therein and a course protractor supported within the large diameter opening. The protractor includes an outer graduated ring rotatably supported within the opening and an inner ring member rotatably supported within the opening by the outer ring member. Affixed to opposite sides of the inner ring member are a pair of pointer members having radial reference lines for facilitating the alignment of the inner ring member with the graduations of the outer ring member. Further included are a pair of support members affixed to opposite sides of the inner ring member and 90° out-of-alignment with the pointer members for supporting a graduated straight edge member having beveled edges to facilitate the drafting of course lines. The straight edge member moves towards and away from the support members while lines drawn along the edge of the straight edge member are drawn at an angle which corresponds to the alignment between the radial reference line of one of the pointer members and one of the graduations formed in the outer ring member.

This invention relates to drafting instruments and, more particularly, to course protractor instruments for determining the true course and distance of a vessel between two points on a chart.

Navigation charts which contain a network of latitude and longitude lines are extremely important in the operation of both large and small craft. Course lines, lines of direction and other data are ordinarily plotted directly on the chart so as to give the operator a graphic representation of his position and the relation of his craft to landmarks and other navigational aids. To this end, directions are usually plotted by means of a parallel ruler (a device which can be moved parallel to itself) or a drafting machine (a device which combines parallel motion with direction indication). Drafting machines are ordinarily quite large and, therefore, find extensive use in larger craft wherein space requirements are not critical. Parallel rulers, on the other hand, are relatively small and find extensive use in smaller craft.

Of the presently devised parallel rulers, many have proven to be quite cumbersome in operation due to the fact that they are dependent upon size for the drafting of accurate course lines rather than mobility of movement in both the vertical and horizontal directions. Other rulers fail to provide easy-to-operate structure for correcting for the magnetic variations in different geographic locations. Still other rulers require additional drafting instruments for the plotting of bearing lines for an object which is obliquely removed from a given reference point.

Accordingly, it is an object of the present invention to provide a course protractor device which overcomes all the disadvantages of the above-mentioned prior art devices.

It is another object of the present invention to provide a compact and convenient course protractor device which can be simply operated and which at the same time provides structure for the drafting of course lines and lines of direction.

It is also an object of the invention to provide a course protractor mechanism for use in small craft for determining the location of the craft from a compass reading of two other points on the chart.

These and other objects of the invention are accomplished by providing a course protractor device comprising a chart board having a frame with a large diameter opening formed therein and a course protractor supported within the large diameter opening. The course protractor includes an outer graduated ring member rotatably supported within the opening by the frame and an inner ring member rotatably supported within the opening by the outer ring member. Affixed to opposite sides of the inner ring member are a pair of pointer members having radial reference lines for facilitating the alignment of the inner ring member with the graduations of the outer ring member. Further included are a pair of support members affixed to opposite sides of the inner ring member and 90° out-of-alignment with the pointer members for supporting a graduated straight edge member having beveled edges to facilitate the drafting of course lines and the like. The straight edge member moves towards and away from the support members while lines drawn along the edges of the straight edge member are drawn at an angle which corresponds to the alignment between the radial reference line of one of the pointer members and one of the graduations formed in the outer ring member.

Further objects and advantages of the invention will be apparent to those skilled in the art from a reading of the following detailed description of a typical embodiment thereof, taken with reference to the accompanying drawings, in which:

FIGURE 2 is a view in fragmentized cross section taken along the line 2—2 of FIGURE 1 and looking in the direction of the arrows;

FIGURE 3 is a view in cross section taken along the line 3—3 of FIGURE 1; and

FIGURE 4 is a view in cross section taken along the line 4—4 of FIGURE 1.

Figure 1:
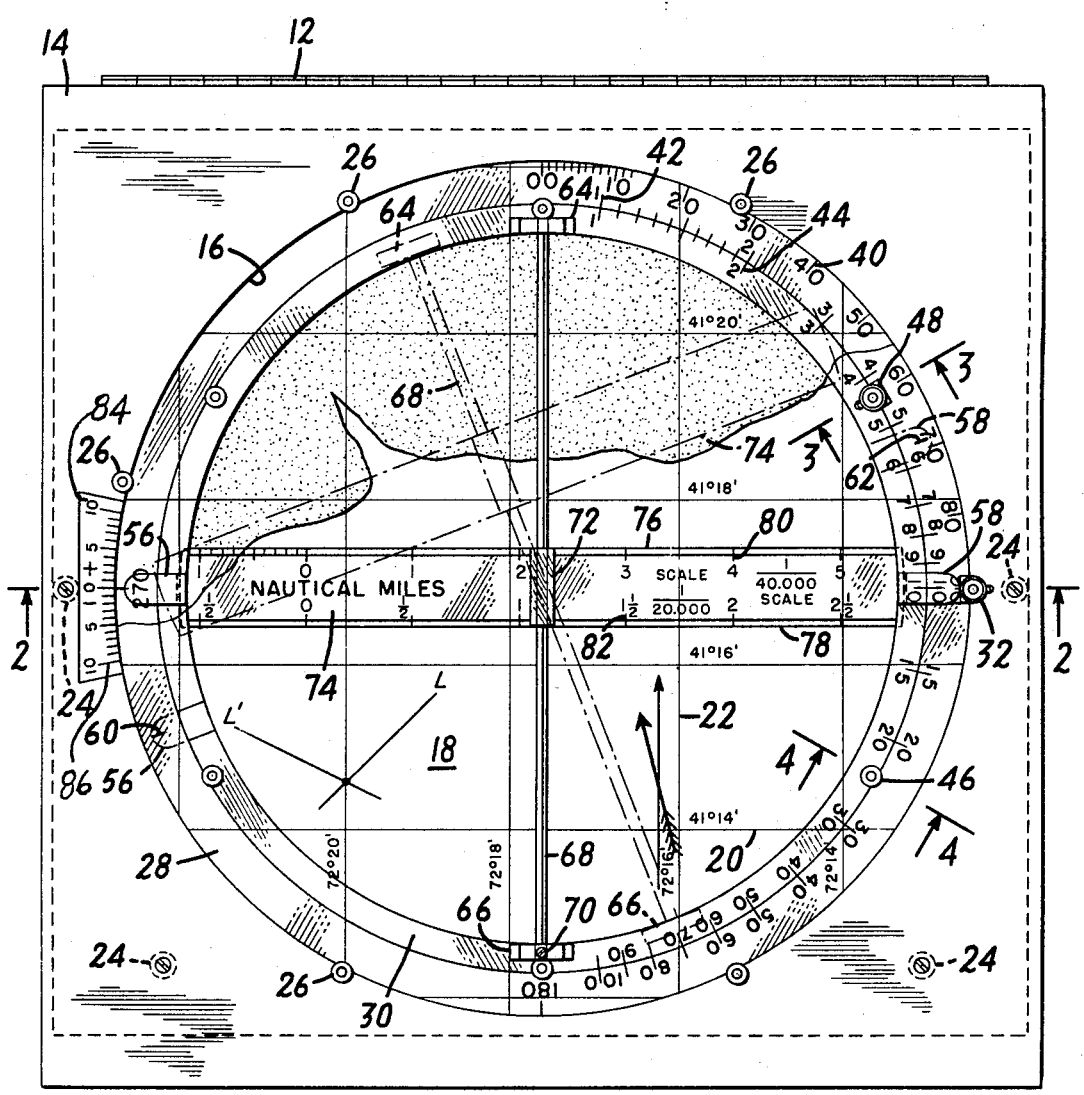
FIGURE 1 is a plan view of an illustrative embodiment of the present invention.

In the representative course protractor device according to the present invention shown in the drawings, there is provided a lower plate 10 which constitutes the foundation of the device. At the top of the lower plate 10, as viewed in FIGURE 1, a hinge 12 extends substantially across the top edge of a frame 14 and affixes the frame 14 to the lower plate 10 so that the frame may be raised away from the lower plate. Formed in the frame 14 is a large diameter opening 16 in which the course protractor mechanism of the instant invention is placed. A chart 18, bearing a network of lines of latitude 20 and lines of longitude 22, may be easily placed onto the plate 10 by rotating the frame upwardly and inserting the chart beneath it. The frame 14 further includes a plurality of selectively spaced stoppers 24 which provide a uniform separation between the lower plate 10 and the frame 14 when the frame is lowered onto the plate.

Supported within the large diameter opening 16 by a plurality of selectively spaced guide screws 26 mounted in the frame 14 is a graduated outer ring member 28, preferably formed of transparent plastic. The guide screws 26 have a generally I-shaped cross section and are mounted in the frame 14 at selectively spaced locations near the perimeter of the opening 16, the upper and lower discs of the screws 16 engaging both the frame 14 and the ring member 28. An inner graduated ring 30 preferably formed of plastic, is supported by the outer ring 28 by the same type guide screws and, accordingly, the structure of the screws will be more fully described with the description of the inner ring 30 hereinbelow. The ring member 28 may be rotated within the opening 16 whenever it is not clamped to a fixed position within the opening by a lock screw 32.

As best seen in FIGURE 2, the lock screw 32 includes a stud 34 which is mounted in the frame, the threaded shaft of the stud extending above the frame for threadedly engaging a knurled knob 36. Interposed between the knob 36 and the upper surface of the frame 14 is a washer 38 which includes a vertical leg member 38a positioned within an opening formed in the frame 14 and a lateral leg member 38b having a curled outer edge for engaging the ring member 28. When the knurled knob 36 is tightened onto the threaded shaft of the stud 34, the lateral leg member 38b of the washer 38 will be tightened against the ring member 28 and preclude any rotational movement thereby.

The upper half of the outer ring member 28 includes equally spaced graduations 40 from 0° to 360° extending completely around the member 28. The graduations progress clockwise so that 0° corresponds to North, 90° East is to the right of North, South is at 180°, and West is at 270°. Formed in the lower half of the ring member 28 and extending substantially around one-half the member 28 are logarithmically spaced graduations 42 which correspond to the D scale of a conventional slide rule. The graduation 42, together with similar graduations 44 formed in the inner ring member 30 and corresponding to the C scale of a conventional slide rule, facilitate the making of simple calculations.

Selectively mounted onto the graduated inner ring member 30 are a plurality of guide screws 46 which enable the outer ring member 28 to support the inner ring member 30. As shown in FIGURE 4, the guide screws 46, as well as the guide screws 26, have a generally I-shaped cross section and include a pair of disc members 46a and 46b connected together by a threaded screw 46c which is inserted through an opening formed in the inner ring 30. The diameters of the discs 46a and 46b are selected such that a portion of each disc extends beyond the outside periphery of the inner ring member 30 to engage the upper and lower surfaces, respectively, of the outer ring member 28.

As best seen in FIGURE 3, the inner ring member also includes a lock screw 48 mounted near the outside periphery of the ring 30 for clamping the inner ring member 30 to the outer ring member 28 to preclude any rotational movement by one ring member with respect to the other. The lock screw 48 is similar in construction to the lock screw 32 and, accordingly, includes a stud 50 which is inserted through an opening formed in the ring 32, the shaft of the stud extending above the inner ring member 30 for threaded engagement with a knurled knob 52. A washer 54 is placed around the shaft of the stud 50 and between the knob 52 and the upper surface of the inner ring 30 for engagement with the inner ring member 30 and a portion of the outer ring member 28. The washer 54 includes a vertical leg member 54a positioned within an opening formed in the ring 30 and a lateral leg member 54b having a curled outer edge for engagement with the ring member 28. It can be seen that when the knurled knob 52 is tightened onto the thread shaft of the stud 50, the leg member 54b of the washer locks the ring members 28 and 30 together and prevents rotational movement by one ring with respect to the other.

As mentioned above, the inner ring 30 includes logarithmically spaced graduations 44 which extend substantially around one-half the inner ring 30. These graduations correspond to the C scale of a conventional slide rule and, as shown, are aligned with the graduations of the D scale of the outer ring member 28. As best shown in FIGURES 1 and 2, there are affixed to opposite sides of the inner ring member 30 a pair of pointer members 56 and 58, each pointer member extending over the inner ring 30 and the outer ring 28 and including a radial reference line 60 and 62, respectively. The radial reference lines 60 and 62 are formed in the members 56 and 58 at the extreme ends thereof such that they may be easily aligned with the graduations 40 formed in the upper half of the outer ring 28. As will be explained hereinbelow, whenever it is desired to plot lines of direction and course lines at a given angle, the inner ring 30 is rotated until the radial reference line of one of the pointer members is aligned with one of the graduations 40 which corresponds to the particular angle.

Also affixed to opposite sides of the inner ring member 30, 90° out-of-phase with the pointer members 56 and 58, are two upright flanges 64 and 66, respectively, each with a circular bore for receiving a cylindrical bar 68 which extends above the frame 14. The bar 68 is held in position by a lock screw 70 in the flange 66. A sleeve 72, preferably formed of plastic, is fitted around the bar 68 in such a manner that it slides freely, but without play, along the bar. Attached to the sleeve 72 is a generally rectangularly shaped straight edge member 74, preferably formed of transparent plastic, extending substantially across the large diameter opening 16 formed in the frame. Inasmuch as the upright flanges 64 and 66 are affixed to the inner ring member 30, 90° out-of-alignment with the radial reference lines 60 and 62 of the pointer members, lines drawn along the straight edge member 74 on the chart 18 will be drawn at the angle or complement thereof indicated by the alignment of the radial reference lines 60 and 62 of the pointer members 56 and 58, respectively, and the graduations 40 of the outer ring member 28. The straight edge member 74 includes beveled or chamfered surfaces 76 and 78 which facilitate the drafting of course lines, lines of direction and the like. Further included are graduations 80 and 82 extending along opposite sides of the straight edge member 74 for facilitating the measurement between two points on the chart 18. As shown, the graduations 80 correspond to the graduations provided on standard charts for fairly large bodies of water, such as, for example, Long Island Sound, and the graduations 82 correspond to the graduations provided on standard charts for smaller bodies of water, such as, for example, inlets or coves.

Also secured within the frame 14 is a rule member 84 which includes equally spaced graduations 86 from 0 to +10 and from 0 to −10. The spacing between the graduations 86 is the same as the spacing between the graduations 40 formed in the outer ring member 28. The rule member 84 is provided to compensate the setting of the ring member 28 for variations in water current, wind velocity and the like.

In operation, the first step is to rotate the frame 14 from the horizontal plane to an oblique plane, inserting the chart 18 of a particular territory onto the lower plate 10 of the course protractor device and then lowering the frame 14 into place. In order to plot the position and distance of a craft relative to two known and observed objects laid down on the chart 18, for example, the lighthouses L and L', the outer ring 28 is first set to align the 0° graduation with magnetic north as depicted on the chart. To this end, the lock screw 48 is loosened and the inner ring member 30 rotated until an alignment is reached between the graduations 42 and 44 of the ring members 28 and 30, respectively. The radial reference lines 60 and 62 of the pointer members would also be aligned with the 270° graduation and the 90° graduation, respectively, of the outer ring member 28. Thereafter, the lock screw 48 as tightened, the lock screw 32 loosened and the ring members 28 and 30 rotated by rotating the sleeve 72 until the support bar 68 is parallel to the line indicating magnetic north and the straight edge member 74 is perpendicular to this line. Thereupon, the knurled knob 36 of the lock screw 32 is tightened until the outer ring 28 is again locked from rotational movement with respect to the frame 14.

A compass reading is then taken on both the lighthouses L and L'. For the purposes of illustration, assume that the lighthouse L bears northeast at 60° from the craft and the lighthouse L' bears northwest at 310°. The knurled knob 52 of the lock screw 48 is again loosened and the sleeve 72 of the straight edge member 74 is turned until the radial reference lines 62 of the pointer member 58 is aligned with the 60° graduation of the outer ring member 28. After tightening the knob 52, the straight edge member 74 is moved along the bar 68 until the lighthouse L is positioned along either edge of the straight edge member 74. From the lighthouse L, a line is then drawn along the beveled edge in a southwesterly direction. The knob 52 is again loosened and the sleeve 72 is rotated counterclockwise until the reference line 62 of the pointer member 58 is aligned with the 310° graduation of the outside ring member 28. The knob 52 is tightened, the straight edge member 74 is moved along the bar 68 until the lighthouse L' is positioned along either edge of the straight edge member and a line is drawn from the lighthouse L' in a southeasterly direction. The point at which the two drawn lines intersect indicates the exact position of the craft. The distance between the craft and the two lighthouses can be read directly from either the graduations 80 or 82 of the straight edge member 74.

To further illustrate the operation of the course protractor of the instant invention, assume that the position of the craft is known and it is desired to ascertain the bearing of another craft or navigational aid depicted on the chart 18. The outside ring 28 is again adjusted to align the 0° graduation with magnetic north rather than true north. Thereupon, the lock screw 48 is loosened and the sleeve 72 of the straight edge member rotated until the unknown craft or aid and the position of the craft are located along the same edge of the straight edge member 74. After tightening the lock screw 48, the bearing angle of the unknown object is read from the graduations 40 of the outer ring member 28. Either the radial reference line 60 of the pointer member 56 will provided a true bearing angle of the object and the radial reference line 62 the complement thereof, or the radial reference line 62 of the pointer member 58 will provide the true bearing angle and the radial reference line 60 will provide the complement thereof, depending upon the location of the craft with respect to the unknown craft or navigational aid. To ascertain the distance between the unknown craft or navigational aid and the craft, either the graduations 80 or the graduations 82 of the straight edge member 74 will provide a direct indication of the distance between the two points.

To further illustrate the operation of the plotting device of the instant invention, assume for the sake of simplicity, that it is desired to ascertain the product of the number 16, multiplied by the number 5. The lock screw 32 is tightened so as to preclude rotational movement by the outer ring member 28 and the lock screw 48 is loosened so as to enable the ring member 30 to rotate with respect to the outer ring member 28. The inner ring member 30 is then rotated until the number 16 is aligned with the number 1 graduation of the D scale formed in the outer ring member 28. The graduation of the C scale formed in the inner ring member 30 which is aligned with the number 5 graduation of the D scale formed in the outer ring member 28 represents the product of the two numbers. In order to perform division, the method is reversed.

It will be understood that the above-described invention is illustrative only and susceptible to considerable modification. Accordingly, all modifications and variations within the skill of the art are included within the spirit and intended scope of the invention as defined by the following claims.

I claim:
1. A course protractor device, comprising a frame having a large diameter opening formed therein, a first graduated ring member rotatably supported within the opening, a second ring member rotatably supported within the opening by the first graduated ring member, a pair of indicator members affixed to opposite sides of the second ring member and extending across the first ring member, each indicator member including a radial reference line for facilitating the alignment of the second ring member with the graduations of the first ring member, a graduated straight edge member providing guide edges along which lines can be drawn and support means extending across the large diameter opening and attached to opposite sides of the second ring member for slideably supporting the straight edge member to provide for the rectilinear motion thereof.

2. A course protractor device according to claim 1 wherein the support means includes a shaft member affixed to opposite sides of the second ring member and extending across the large diameter opening prependicularly of the radial reference lines of the pointer members and perpendicularly of the guide edges of the straight edge member.

3. A course protractor device according to claim 2 wherein the graduated straight edge member includes a slide member mounted on the shaft member and a graduated ruler member having beveled edges affixed to the slide member and extending perpendicularly of the shaft member across the large diameter opening of the frame.

4. A course protractor device according to claim 3 further including a first clamp mounted in the frame for clamping the first graduated ring member in fixed position with respect to the frame and a second clamp mounted in the second ring member for clamping the second ring member in fixed position with respect to the first graduated ring member.

5. A course protractor device according to claim 4 wherein the first graduated ring member includes equally spaced graduations from 0° to 360° formed in the upper half of the ring member and extending completely therearound and further includes logarithmically spaced graduations formed in the lower half of the ring member and extending substantially around one-half the ring member.

6. A course protractor device according to claim 5 wherein the second ring member includes logarithmically spaced graduations formed therein and extending substantially around one-half the ring member.

7. A course protractor device according to claim 6 further including a plurality of selectively spaced guide members mounted in the frame close to the perimeter of the large diameter opening for engaging the frame and first graduated ring member to thereby rotatably support the first graduated ring member within the large diameter opening.

8. A course protractor according to claim 7 further including a plurality of selectively spaced guide members mounted in the second ring member close to the first graduated ring member for engaging the first graduated ring member and the second ring member to thereby rotatably support the second ring member within the large diameter opening.

9. A course protractor according to claim 8 further including a base adapted to receive a chart and further including means for pivotably attaching the frame to the base.

References Cited

UNITED STATES PATENTS

| | | | |
|---|---|---|---|
| 1,927,992 | 9/1933 | Pulver | 33—189 |
| 2,216,490 | 10/1940 | Garrett | 33—75 |
| 2,756,929 | 7/1956 | McGee | 33—76 |
| 2,904,885 | 9/1959 | Wood | 33—75 X |

FOREIGN PATENTS 732,762  3/1943  Germany.

HARRY N. HAROIAN, *Primary Examiner.*